(12) United States Patent
Kubo

(10) Patent No.: US 11,489,983 B2
(45) Date of Patent: Nov. 1, 2022

(54) FACSIMILE COMMUNICATION DEVICE, IMAGE FORMING APPARATUS, REGISTRATION METHOD, AND NON-TRANSITORY RECORDING MEDIUM

(71) Applicant: Yutaroh Kubo, Kanagawa (JP)

(72) Inventor: Yutaroh Kubo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/533,113

(22) Filed: Nov. 23, 2021

(65) Prior Publication Data
US 2022/0174176 A1 Jun. 2, 2022

(30) Foreign Application Priority Data
Nov. 30, 2020 (JP) .............................. JP2020-199233

(51) Int. Cl.
*H04N 1/32* (2006.01)
*H04N 1/00* (2006.01)

(52) U.S. Cl.
CPC ....... *H04N 1/3201* (2013.01); *H04N 1/00068* (2013.01); *H04N 1/00408* (2013.01); *H04N 1/32016* (2013.01); *H04N 1/32101* (2013.01); *H04N 2201/0093* (2013.01); *H04N 2201/0094* (2013.01); *H04N 2201/3202* (2013.01); *H04N 2201/3209* (2013.01)

(58) Field of Classification Search
CPC ............. H04N 1/3201; H04N 1/00068; H04N 1/00408; H04N 1/32016; H04N 1/32101; H04N 2201/009; H04N 2201/3202; H04N 2201/3209; H04N 2201/0093; H04N 2201/0094

USPC ......................................................... 358/440
See application file for complete search history.

(56) References Cited

U.S. PATENT DOCUMENTS

| 2005/0219640 A1 | 10/2005 | Kasatani | |
| 2008/0007793 A1* | 1/2008 | Filbrich | H04N 1/32037 358/440 |
| 2019/0098166 A1* | 3/2019 | Sugita | H04N 1/00413 |

FOREIGN PATENT DOCUMENTS

| JP | 2000-156744 | 6/2000 |
| JP | 2005-242520 | 9/2005 |
| JP | 2007-013239 | 1/2007 |
| JP | 2008-067302 | 3/2008 |

(Continued)

*Primary Examiner* — Kent Yip
(74) *Attorney, Agent, or Firm* — Xsensus LLP

(57) ABSTRACT

A facsimile communication device includes circuitry to count, for each of one or more facsimile numbers, at least one of the number of facsimile transmission times and the number of output times that is stored in association with a corresponding one of the one or more facsimile numbers. The circuitry determines whether registration of a specified facsimile number for unwanted facsimile is reasonable to be performed, based on at least one of the number of facsimile transmission times associated with the specified facsimile number and the number of output times associated with the specified facsimile number. The specified facsimile number is included in the one or more facsimile numbers. The circuitry registers the specified facsimile number for the unwanted facsimile in response to determining that the registration of the specified facsimile number for the unwanted facsimile is reasonable to be performed.

11 Claims, 9 Drawing Sheets

(56) References Cited

FOREIGN PATENT DOCUMENTS

| JP | 2010-147952 | 7/2010 |
|----|-------------|--------|
| JP | 2017-060098 | 3/2017 |

* cited by examiner

FIG. 6A

|  | | | | 101 100 | |
|---|---|---|---|---|---|
| COPY | SCAN | FAX | TAP TO END REMOTE OPERATION | ? | LOG OUT |

REGISTER/MODIFY SPECIFIC CONTACT    [CANCEL] [OK]

| REGISTRATION NUMBER | 1 <1-250> |
|---|---|
| FAX ADDRESS/NUMBER (RTI/CSI) | 0312345678 <10/24> |
| MATCH CONDITION | EXACT MATCH |
| SETTING OF BLOCKING FAXES | ON |

| COPY | SCAN | FAX | REMOTE OPERATION BY ADMINISTRATOR | ? | LOG OUT |
|---|---|---|---|---|---|

The input information may be incorrect.
Are you sure for the registration?
If YES, press REGISTER.

[CANCEL]  [REGISTER]

CHECK STATUS  2020/11/24 13:50     STOP

102 — CANCEL UNWANTED FAX REGISTRATION

103 — EXECUTE UNWANTED FAX REGISTRATION

FACSIMILE COMMUNICATION DEVICE, IMAGE FORMING APPARATUS, REGISTRATION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-199233, filed on Nov. 30, 2020, in the Japan Patent Office, the entire disclosure of which is hereby incorporated by reference.

BACKGROUND

Technical Field

Embodiments of the present disclosure relate to a facsimile communication device, an image forming apparatus, a registration method, and a non-transitory computer readable medium.

Related Art

Today, there are known facsimile transmission/reception apparatuses (facsimile communication devices, FAX apparatuses, FAX devices) that read characters or images printed on a sheet of paper and transmit the characters or the images to a terminal apparatus that is a destination via a communication line or a communication network, such as a telephone line or the Internet. Such a FAX apparatus registers, in advance, a FAX number of a counterpart of which an incoming FAX is to be rejected. After the registration, the incoming FAX from the registered counterpart is rejected.

As such a technique in relation to rejecting incoming faxes by a FAX apparatus, an image communication apparatus that avoids duplicate registration is known. The duplicate registration is, more specifically, registering the same FAX address for an incoming fax rejection setting and a transfer setting.

In such an image communication apparatus, a transfer setting and a blacklist setting are made. In the transfer setting, a matching pattern of a FAX number of a counterpart is set as a transfer condition. In the blacklist setting, a matching pattern of a transmission source is set as a call rejection condition. In registering in relation to the transfer setting, when a duplicate state in which a transmission source corresponding to the transfer condition of the transfer setting being accepting matches another transmission source corresponding to a registered incoming fax rejection condition is detected by referring a blacklist, the registration is modified in a manner that the transfer condition, which is accepting, or the registered incoming fax rejection condition is modified. Accordingly, duplicate registration of the same FAX numbers of one of which is as a transmission source of incoming faxes and the other one of which is as a transmission source of transfer is avoided.

SUMMARY

An embodiment of the present disclosure includes a facsimile communication device including circuitry to count, for each of one or more facsimile numbers, at least one of the number of facsimile transmission times and the number of output times that is stored in association with a corresponding one of the one or more facsimile numbers. The number of facsimile transmission times is counted in relation to a facsimile transmitted. The number of output times is counted in relation to a facsimile received and output. The circuitry further determines whether registration of a specified facsimile number for unwanted facsimile is reasonable to be performed, based on at least one of first information and second information. The first information indicates the number of facsimile transmission times associated with the specified facsimile number. The second information indicates the number of output times associated with the specified facsimile number. The specified facsimile number is included in the one or more facsimile numbers. The circuitry further registers the specified facsimile number for the unwanted facsimile in response to a determination result indicating that the registration of the specified facsimile number for the unwanted facsimile is reasonable to be performed.

An embodiment of the present disclosure includes a registration method including counting, for each of one or more facsimile numbers, at least one of the number of facsimile transmission times and the number of output times that is stored in association with a corresponding one of the one or more facsimile numbers. The number of facsimile transmission times is counted in relation to a facsimile transmitted. The number of output times is counted in relation to a facsimile received and output. The method further includes determining whether registration of a specified facsimile number for unwanted facsimile is reasonable to be performed, based on at least one of first information and second information. The first information indicates the number of facsimile transmission times associated with the specified facsimile number. The second information indicates the number of output times associated with the specified facsimile number. The specified facsimile number is included in the one or more facsimile numbers. The method further includes registering the specified facsimile number for the unwanted facsimile, in response to a determination result indicating that the registration of the specified facsimile number for the unwanted facsimile is reasonable to be performed.

An embodiment of the present disclosure includes a non-transitory recording medium storing a plurality of instructions which, when executed by one or more processors, causes the processors to perform a method. The method includes counting, for each of one or more facsimile numbers, at least one of the number of facsimile transmission times and the number of output times to be stored in association with a corresponding one of the one or more facsimile numbers. The number of facsimile transmission times is counted in relation to a facsimile transmitted. The number of output times is counted in relation to a facsimile received and output. The method further includes determining whether registration of a specified facsimile number for unwanted facsimile is reasonable that is performed, based on at least one of first information and second information. The first information indicates the number of facsimile transmission times associated with the specified facsimile number. The second information indicates the number of output times associated with the specified facsimile number. The specified facsimile number is included in the one or more facsimile numbers. The method further includes registering the specified facsimile number for the unwanted facsimile, in response to a determination result indicating that the registration of the specified facsimile number for the unwanted facsimile is reasonable to be performed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A is a diagram illustrating an example of a registration screen in relation to registration for the unwanted FAX to reject incoming faxes, according to the one of the embodiments;

FIG. 6B is a diagram illustrating an example of a screen including a confirmation dialog box for confirming the registration, according to the one of the embodiments;

Figure 1:
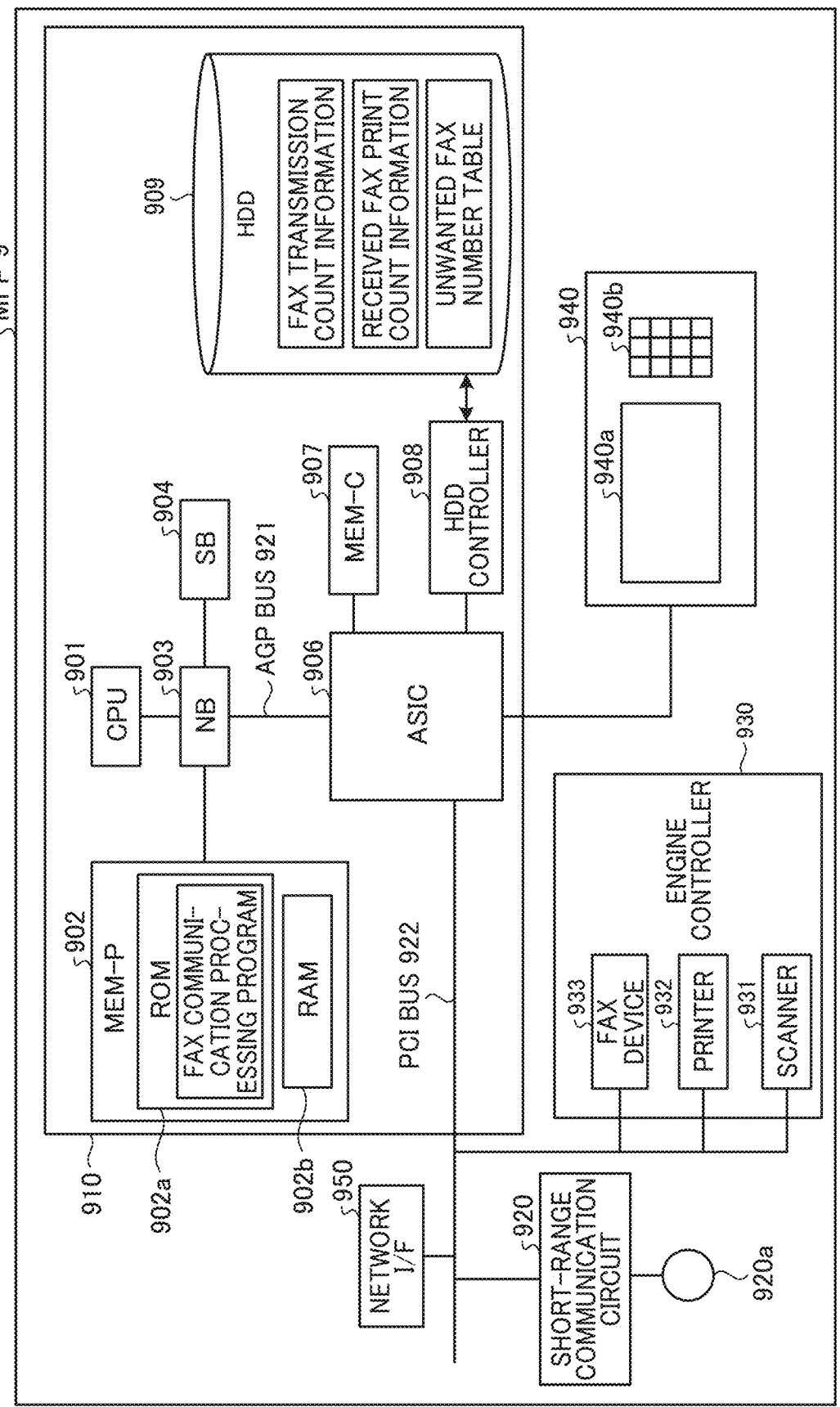
FIG. 1 is a block diagram illustrating an example of a main part of a multifunction peripheral (MFP) according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a multifunction peripheral (MFP) that is an example of an image forming apparatus or a facsimile communication device (facsimile apparatus) according to some embodiments and an unwanted facsimile (FAX) management system according to some embodiments are described with reference to the attached drawings. In the following description, a term of unwanted FAX may be replaced by a term of unsolicited FAX.

First Embodiment

FIG. 1 is a block diagram illustrating an example of a main part of an MFP 9 according to a first embodiment. As illustrated in FIG. 1, the MFP 9 includes a controller 910, a short-range communication circuit 920, an engine controller 930, a control panel 940, and a network interface (I/F) 950.

The controller 910 performs overall control of the MFP 9. For example, the controller 910 performs rendering control, communication control, and processing of inputting from the control panel 940. The controller 910 includes a Central Processing Unit (CPU) 901, a system memory (MEM-P) 902, a North Bridge (NB) 903, a South Bridge (SB) 904, an Application Specific Integrated Circuit (ASIC) 906, a local memory (MEM-C) 907, a Hard Disk Drive (HDD) controller 908, and an HDD 909. The NB 903 and the ASIC 906 are connected through an Accelerated Graphics Port (AGP) bus 921.

The CPU 901 is a processor that performs overall control of the MFP 9. The NB 903 is a bridge that connects the CPU 901 to the MEM-P 902, the SB 904, and the AGP bus 921. The NB 903 includes a memory controller that controls reading from and writing to the MEM-P 902, a Peripheral Component Interconnect (PCI) master, and an AGP target.

The MEM-P 902 includes a Read Only Memory (ROM) 902a, which is a memory for storing a program or data that implements each function of the memory controller, and a RAM 902b, which is used for developing a program or data or is used as a memory for rendering at the time of memory printing. The program stored in the ROM 902a may be stored in any computer-readable storage medium, such as a Compact Disc-Read Only Memory (CD-ROM), Compact Disc-Recordable (CD-R), or Digital Versatile Disc (DVD), in a file format installable or executable by the computer for distribution.

A FAX communication processing program (an example of an unwanted facsimile management program) for performing FAX notification processing is stored in the ROM 902a. The CPU 901 executes the FAX communication processing program to determine, as described later, whether to register a counterpart to which incoming fax rejection is to be set, thereby preventing erroneous registration of information on the counterpart in relation to the incoming fax rejection.

The SB 904 is a bridge that connects the NB 903 to a PCI device or a peripheral device. The ASIC 906 is an Integrated Circuit (IC) dedicated to an image processing use, and serves as a bridge that connects the AGP bus 921, a PCI bus 922, the HDD controller 908, and the MEM-C 907 to each other.

The ASIC 906 includes a PCI target, an AGP master, an arbiter (ARB) as a central processor of the ASIC 906, a memory controller for controlling the MEM-C 907. The ASIC 906 also includes a plurality of Direct Memory Access Controllers (DMACs) to convert coordinates of image data by using hardware logic, and a PCI unit that transfers data between a scanner 931 and a printer 932 through the PCI bus 922. A Universal Serial Bus (USB) interface or an Institute of Electrical and Electronics Engineers (IEEE) 1394 interface may be connected to the ASIC 906.

The MEM-C 907 is a local memory used as a buffer for image data to be copied or a code buffer. The HDD 909 is a storage device for storing image data, font data used during printing, and forms.

In the HDD 909, fax transmission count information (first information) is stored. The fax transmission count information indicates the number of transmission times for each counterpart (each FAX number), which is a destination to transmit a fax according to a user operation performed by a user of the MFP 9. In addition, in the HDD 909, received FAX print count information (second information) is stored. The received FAX print count information indicates the number of printing times for each counterpart (each FAX number) from which a FAX is received and printed out (received and output) according to a user operation performed by the user of the MFP 9. In addition, in the HDD 909, an unwanted FAX number table is stored that is as a registration area (storage area) for the FAX numbers of the counterparts from each of which the user desires to reject incoming faxes. In the description, the incoming fax includes an incoming call.

The HDD controller 908 performs writing and reading control with respect to the HDD 909 under control of the CPU 901. The AGP bus 921 is a bus interface for a graphics accelerator card, which is proposed to accelerate graphics processing. The AGP bus 921 directly accesses the MEM-P 902 with high throughput to accelerate the graphics accelerator card.

The short-range communication circuit 920 is provided with a short-range communication antenna 920*a*. The short-range communication circuit 920 is a communication circuit that communicates in compliance with the Near Field Communication (NFC) (Registered Trademark), the Bluetooth (Registered Trademark), or the like. The engine controller 930 includes the scanner 931 and the printer 932.

The control panel 940 includes a display 940*a* such as a touch panel that displays a current settings (setting values) or a selection screen and receives inputs from a user. Further, the control panel 940 includes an operation device 940*b* such as a numeric keypad for inputting settings (setting values) for a condition related to image formation such as a density setting condition and a start key for instructing a copy start.

The engine controller 930 includes the scanner 931, the printer 932, and a FAX device (facsimile communication (transmission/reception) device) 933. The scanner 931 reads an image to be copied, printed, or transmitted as a FAX. The printer 932 prints an image corresponding to print data on a predetermined sheet. The FAX device 933 performs FAX transmission to a FAX number of a specified counterpart. The FAX device 933 further receives an incoming facsimile signal. In addition, the FAX device 933 has a function of rejecting an incoming fax from a facsimile (FAX) number of a counterpart to which the rejection is set in advance.

In response to an instruction to select a specific application via the control panel 940, for example, by using an application switch key, the MFP 9 switches between a document box function, a copy function, a print function, and a FAX function to be performed. The MFP 9 is in a document box mode when the document box function is selected and is in a copy mode when the copy function is selected. Further, the MFP 9 is in a printer mode when the printer function is selected and is in a FAX mode when the FAX function is selected.

The network I/F 950 is an interface for performing data communication by using a communication network. The short-range communication circuit 920 and the network I/F 950 are electrically connected to the ASIC 906 through the PCI bus 922.

Functional Configuration of MFP

Figure 2:
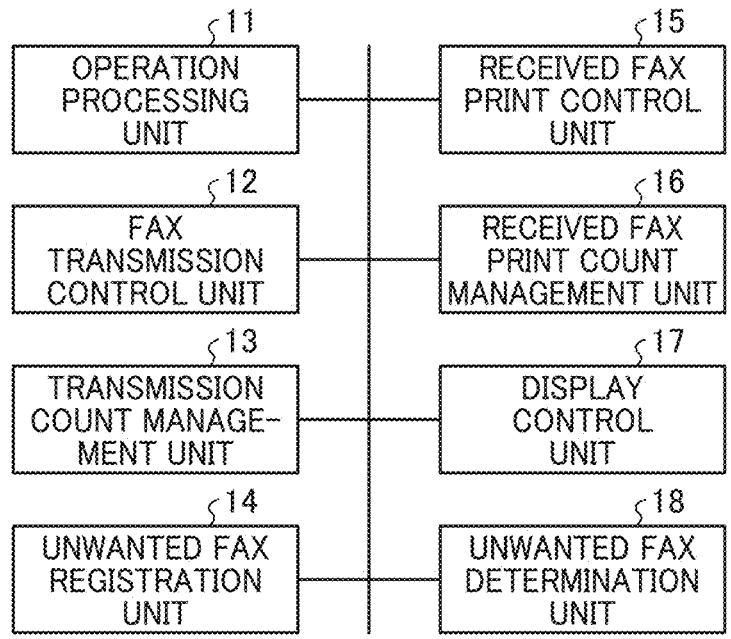
FIG. 2 is a block diagram illustrating an example of a functional configuration of the MFP according to the first embodiment.

FIG. 2 is a block diagram illustrating an example of a functional configuration of the MFP 9 according to the first embodiment. The CPU 901 executes the FAX communication processing program stored in the ROM 902*a* and thereby implements functions of an operation processing unit 11, a FAX transmission control unit 12 (an example of a transmission unit), a transmission count management unit 13, and an unwanted FAX registration unit 14 (an example of a registration unit), which are illustrated in FIG. 2. In addition, the CPU 901 executes the FAX communication processing program and thereby implements functions of a received FAX print control unit 15, a received FAX print count management unit 16 (an example of an output count management unit), a display control unit 17, and an unwanted FAX determination unit 18 (an example of a determination unit).

The operation processing unit 11 receives and processes various user operations, for example, an input operation of inputting a FAX number corresponding to an incoming fax rejection setting (incoming fax rejection). The FAX transmission control unit 12 performs FAX transmission control with respect to a specified FAX number. The transmission count management unit 13 stores in the HDD 909 a FAX number in relation to FAX transmission and the number of transmission times corresponding to the FAX number in association with each other. The unwanted FAX registration unit 14 registers a FAX number registered according to a user operation in the unwanted FAX number table in the HDD 909.

The received FAX print control unit 15 performs print control with respect to a received FAX to which a print instruction is received according to a user operation. The received FAX print count management unit 16 stores in the HDD 909 a FAX number with respect to which printing is performed among the received FAX numbers and the number of printing times. The display control unit 17 displays on the display 940*a*, for example, a confirmation dialog box that is serves as an input screen for inputting a FAX number to which the incoming fax rejection is set. The unwanted FAX determination unit 18 determines whether to register a FAX number for which a registration instruction for the incoming fax rejection is given by the user, based on the number of FAX (facsimile) transmission times and the number of received FAX printing times, which are stored in the HDD 909.

In this example, the operation processing unit 11 to the unwanted FAX determination unit 18 are implemented by software by using the FAX communication processing program. However, all or a part of these functions may be implemented by hardware such as an Integrated Circuit (IC).

In some embodiments, the FAX communication processing program is stored in a computer-readable recording medium such as a Compact Disc Read Only Memory (CD-ROM) and a Flexible Disk (FD), as installable or executable file data, for distribution. In some embodiments, the FAX communication processing program is provided by being recorded on a computer-readable recording medium such as a CD-R, a Digital Versatile Disk (DVD), a BLU-RAY (Registered Trademark) disk, or a semiconductor memory. In some embodiments, the FAX communication processing program is provided by being installed via a network such as the Internet. In some embodiments, the FAX communication processing program is provided by being incorporated in a ROM or the like in the apparatus in advance.

Updating Number of Transmission Times

Figure 3:
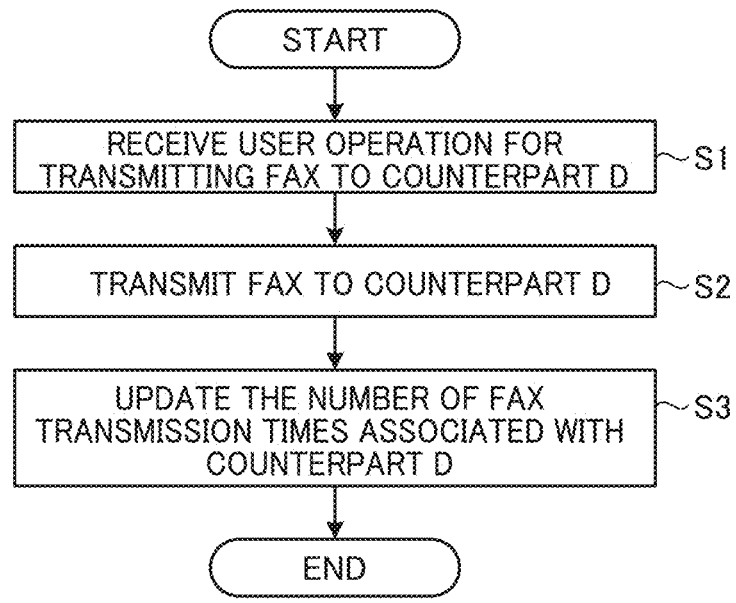
FIG. 3 is a flowchart illustrating an example of a process of updating information on the number of facsimile (FAX) transmission times stored in a Hard Disk Drive (HDD), according to one of the embodiments.

FIG. 3 is a flowchart illustrating an example of a process of updating information on the number of FAX transmission times stored in the HDD 909, according to the present embodiment. The operation processing unit 11 receives a FAX transmission instruction that is an instruction to transmit a FAX to a counterpart D (step S1). The instruction is input by the user via the control panel 940. Then, the FAX transmission control unit 12 causes the FAX device 933 to transmit the FAX to the counterpart D (step S2).

When the FAX is transmitted to the counterpart D, the transmission count management unit 13 determines whether an information record including a FAX number of the counterpart D and the number of FAX transmission times associated with the FAX number of the counterpart D is stored in the HDD 909. When the FAX number of the counterpart D to which the FAX has been transmitted and the number of transmission times associated with the FAX number of the counterpart D are not stored in the HDD 909, the transmission count management unit 13 newly generates a record of FAX transmission count information to be stored in the HDD 909 (step S3). In the record of FAX transmission count information, the FAX number to which the FAX has transmitted and the number of transmission times (FAX transmission times) corresponding to the FAX number are associated with each other.

When the FAX number of the counterpart D to which the FAX has been transmitted and the number of transmission times associated with the FAX number of the counterpart D are already stored in the HDD 909, the transmission count management unit 13 increments the number of FAX transmission times corresponding to the FAX number to which the FAX has been transmitted by one to update the FAX transmission count information (step S3).

As described above, the transmission count management unit 13 updates the FAX transmission count information by storing (registering) or updating the record corresponding to the FAX number for each time when a FAX is transmitted. Accordingly, the FAX number and the number of FAX transmission times are stored in association with each other in the HDD 909 in a manner that the number of FAX transmission times is counted and accumulated for each counterpart from which a FAX is transmitted.

Updating Number of Received Fax Printing Times

Figure 4:
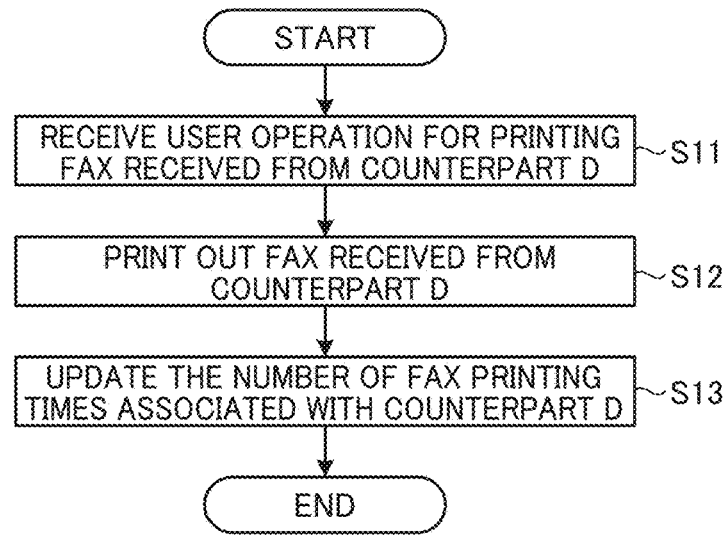
FIG. 4 is a flowchart illustrating an example of a process of updating the number of received FAX printing times stored in the HDD, according to the one of the embodiments.

FIG. 4 is a flowchart illustrating an example of a process of updating the number of received FAX printing times stored in the HDD 909, according to the present embodiment. The operation processing unit 11 receives a print instruction that is an instruction to print a FAX received from the counterpart D (step S11). The print instruction is input by the user via the control panel 940. Then, the received FAX print control unit 15 causes the printer 932 to print the received FAX (step S12).

When the received FAX is printed, a received FAX print count management unit 16 discriminates whether an information record including a FAX number of the counterpart D and the number of printing times associated with the FAX number is stored in the HDD 909. When the FAX number of the counterpart D in relation to which the received FAX has been printed and the number of printing times associated with the FAX number of the counterpart D are not stored in the HDD 909, the received FAX print count management unit 16 newly generates a record of received FAX print count information to be stored in the HDD 909 (step S13). In the record of received FAX print count information, the FAX number in relation to which the received FAX has been printed and the number of printing times (received FAX printing times) corresponding to the FAX number are associated with each other.

When the FAX number of the counterpart D in relation to which the received FAX has been printed and the number of printing times associated with the FAX number of the counterpart D are already stored in the HDD 909, the received FAX print count management unit 16 increments the number of FAX printing times corresponding to the FAX number in relation to which the received FAX has been printed by one to update the received FAX print count information (step S13).

As described above, the received FAX print count management unit 16 updates the received FAX print count information by storing (registering) or updating the record corresponding to the FAX number for each time when a received FAX is printed. Accordingly, the FAX number and the number of printing times are stored in association with each other in the HDD 909 in a manner that the number of printing times is counted and accumulated for each counterpart from which a FAX to be printed out is received (transmitted).

The number of FAX receiving times may be stored in the HDD 909. A FAX number from which a FAX to be printed is received (transmitted) may have a low probability to be set for the incoming fax rejection. As the number of printing times increases, the probability that an incoming fax from the FAX number is rejected becomes remarkably low. Accordingly, by storing the FAX number from which a FAX to be actually printed is received (transmitted) among all FAX numbers received, information of the stored FAX number is used as highly reliable information for determining whether to reject the incoming faxes.

In addition, print/printing is an example of "output/outputting". In the example of the present embodiment, the number of printing times is counted to be accumulated and used. In some embodiments, for example, the number of output times indicating, for example, the number of times of outputting content of a received FAX to a memory for storage may be counted to be accumulated and used.

Registering for Unwanted Fax

Figure 5:
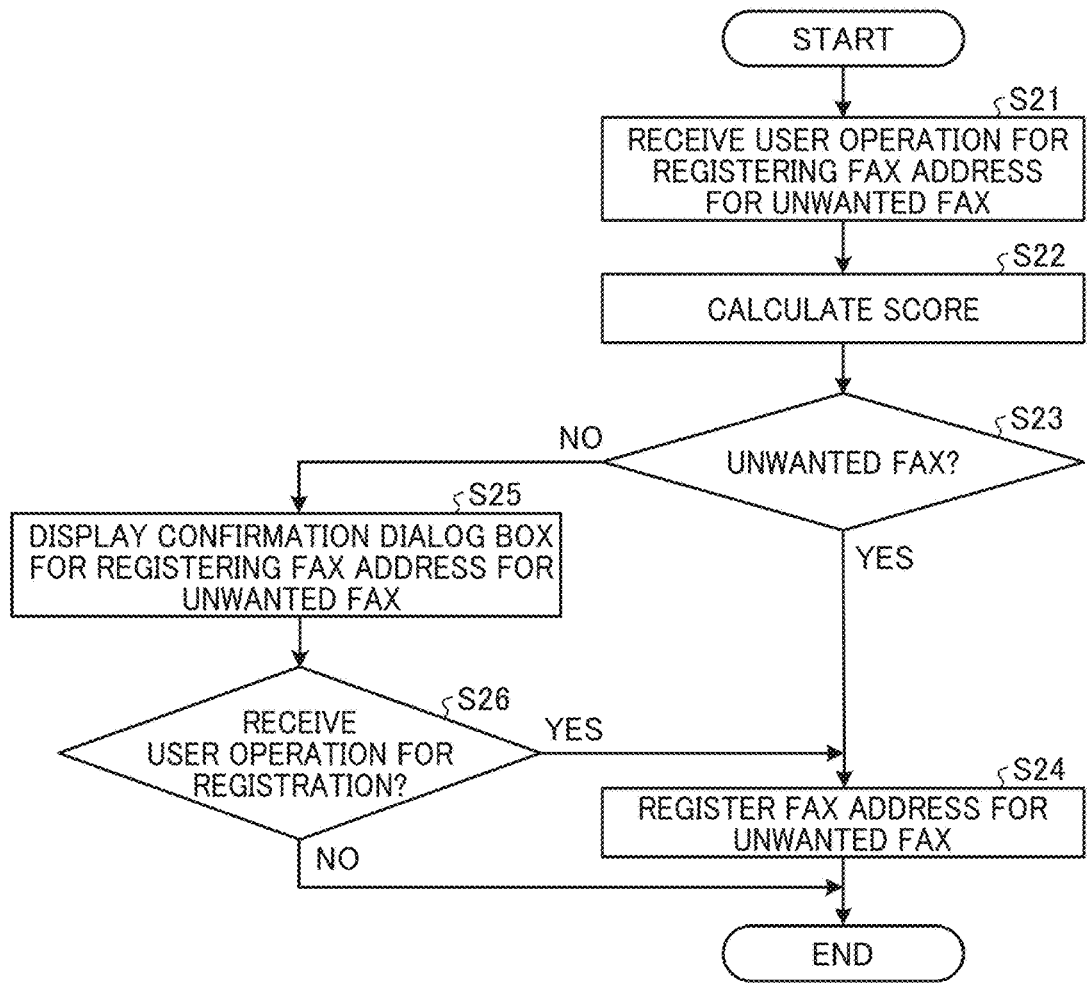
FIG. 5 is a flowchart illustrating an example of a process of performing registration for unwanted FAX to reject incoming faxes, according to the one of the embodiments.

The MFP 9 according to the first embodiment determines whether to perform registration for unwanted FAX (an unwanted FAX setting) to reject incoming faxes based on the fax transmission count information or the received FAX print count information. FIG. 5 is a flowchart illustrating an example of a process of performing registration for the unwanted FAX to reject the incoming faxes, according to the present embodiment.

The operation processing unit 11 receives a user operation for instructing to register a FAX address, such as a FAX number, for the unwanted FAX via the control panel 940 (step S21). The user operation for instructing to register a FAX address for the unwanted FAX may be referred to as an unwanted FAX address registration instruction, hereinafter. In response to the unwanted FAX address registration instruction, the display control unit 17 causes the display 940*a* to display a registration screen, which is used to register for the unwanted FAX, as illustrated in FIG. 6A. In a case of registering a FAX number as the unwanted FAX address, a registration number, a FAX number, which is to be registered for the unwanted FAX, and information on whether to set for the unwanted FAX according to the registration screen.

In addition, the display control unit 17 displays a cancel button 101 for receiving cancellation of the registration for the unwanted FAX and an OK button 100 for receiving execution of the registration for the unwanted FAX to block (reject receiving) the incoming faxes on the registration screen. In response to a user operation performed with respect to the OK button 100 after a user input of the FAX number, which is to be registered for the unwanted FAX, an unwanted FAX registration execution instruction is received.

In response to the unwanted FAX registration execution instruction, the unwanted FAX determination unit 18 determines whether the registration of the FAX number as the unwanted FAX address (for the unwanted FAX) based on the FAX transmission count information or the received FAX print count information corresponding to, or associated with, the specified FAX number (specified facsimile number) that is a FAX number specified for the registration, stored in the HDD 909.

More specifically, as indicated in Table 1 below, the unwanted FAX determination unit 18 multiplies the number of FAX transmission times n1 indicated by the FAX transmission count information corresponding to the FAX number specified to be registered for the unwanted FAX by a predetermined weighting coefficient w1 (an example of first weighting coefficient) to calculate a score w1×n1 corresponding to the number of FAX transmission times. In addition, the unwanted FAX determination unit 18 calculates a score n2×W2 corresponding to the number of received FAX printing times by multiplying a predetermined weighting coefficient w2 (an example of second weighting coefficient) by the number of received FAX printing times n2 indicated by the received FAX print count information corresponding to the FAX number specified to be registered for the unwanted FAX.

TABLE 1

| | Number of Times | Weighting Coefficient | Score |
|---|---|---|---|
| FAX Transmission | n1 | w1 | w1 × n1 |
| Received FAX Print | n2 | w2 | w2 × n2 |

Then, unwanted FAX determination unit 18 performs addition processing to add the calculated score w1×n1 corresponding to the number of FAX transmission times to the calculated score w2×n2 corresponding to the number of received FAX printing times, and then obtains scores, as indicated in Table 2 below, Na, Nb, . . . each of which is for the address specified to be registered for the unwanted FAX (step S22).

TABLE 2

| Address | Score |
|---|---|
| A | Na |
| B | Nb |
| C | Nc |
| D | Nd |
| E | Ne |

As the number of FAX transmission times and the number of received FAX printing times increase, each of the scores, Na, Nb, . . . , increases. The unwanted FAX determination unit 18 determines whether a score obtained by adding the score of w1×n1 corresponding to the number of FAX transmission times to the score of w2×n2 corresponding to the number of received FAX printing times is less than a predetermined threshold value (step S23). The predetermined threshold value may be set by a user or a designer.

In a case that the score obtained by the addition processing is less than the predetermined threshold value, this means that the FAX number has a small number for both of the number of transmission times and the number of printing times. Such a FAX number is acceptable to be registered for the unwanted FAX. That is, it is thought that there is little problem to register such a FAX number. Accordingly, when the score obtained by the addition processing is less than the predetermined threshold value, the unwanted FAX determination unit 18 determines that the FAX number may be a FAX number to be registered for the "unwanted" FAX (step S23: YES).

When the unwanted FAX determination unit 18 determines that the input FAX number may be a FAX number to be registered for the "unwanted" FAX (step S23: Yes), the unwanted FAX registration unit 14 stores the FAX number input by the user in the unwanted FAX number table in the HDD 909 (step S24), and the process illustrated in FIG. 5 ends.

On the other hand, in a case that the score obtained by the addition processing is equal to or greater than the predetermined threshold value, this means that the FAX number has a large number for both of the number of transmission times and the number of printing times. Such a FAX number has a high probability to be an incorrect FAX number for the registration for the unwanted FAX, which may be an erroneous instruction made by the user.

Accordingly, when the score obtained by the addition processing is equal to or greater than the predetermined threshold value, the unwanted FAX determination unit 18 determines that the FAX number is not a FAX number to be registered for the "unwanted" FAX (step S23: NO).

When the FAX number is determined not to be as a FAX number to be registered for the unwanted FAX (step S23: No), the display control unit 17 causes the display 940a to display an unwanted FAX registration confirmation dialog box (an example of confirmation screen) as illustrated in FIG. 6B (step S25).

In the example illustrated in FIG. 6B, the display control unit 17 displays a message, such as for example, "The input information may be incorrect. Are you sure for the registration?" In addition, the display control unit 17 displays a cancel button 102 for instructing cancellation of the registration and an execution button (register button) 103 for instructing execution of the registration in the confirmation dialog box along with such a confirmation message.

In step S26, the unwanted FAX registration unit 14 determines whether the execution button 103 or the cancel button 102 has been operated. In a case that the execute button 103 has been operated by the user even when such a message to confirm for the registration is displayed (step26: YES), this means that the user is sure to execute the registration of the FAX number for the unwanted FAX. Accordingly, unwanted FAX registration unit 14 stores the FAX number specified by the user in the unwanted FAX number table of the HDD 909 (step S24), and the process illustrated in FIG. 5 ends.

On the other hand, when the cancel button 102 is operated (step S26: NO), this means that the registration of the FAX number for the unwanted FAX is an erroneous operation made by the user. Accordingly, the process illustrated in FIG. 5 ends without the unwanted FAX registration unit 14 registering the FAX number specified by the user.

Effects of First Embodiment

As described above, the MFP 9 according to the first embodiment calculates a score corresponding to a counterpart by weighting each of the number of FAX transmission times corresponding to the counterpart and the number of received FAX printing times corresponding to the counterpart and determine whether the counterpart is really a target to be registered for the unwanted FAX and detect the counterpart that is not to be a target for the unwanted FAX according to the determination. Whether to register is predicted in advance on the basis of the score, and when the user operates to register a FAX number that is not intended to be registered by the user for the unwanted FAX, a warning is displayed on a screen to notify the user of an erroneous operation.

As a result, a probability to mistakenly register information, which is incorrect information on a counterpart, for the unwanted FAX is reduced or prevented, and the FAX communication reflecting intention of the user is performed. Accordingly, an inconvenient situation in which the user of the MFP 9 does not receive a FAX from a counterpart from which the user desires to receive a FAX, but receives a FAX from another counterpart from which the user desires to block a FAX may be prevented.

Second Embodiment

An unwanted facsimile (FAX) management system according to a second embodiment of the present disclosure is described.

System Configuration

Figure 7:
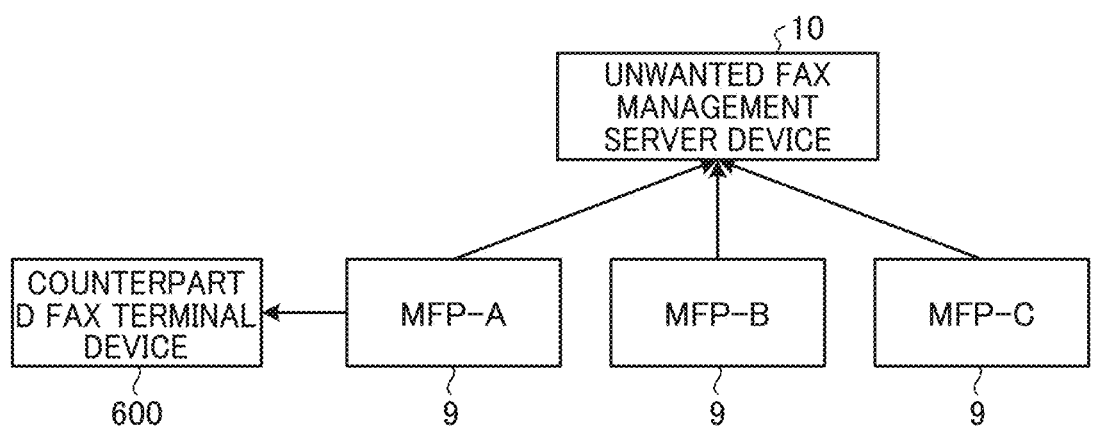
FIG. 7 is a diagram illustrating an example of a system configuration of an unwanted FAX management system according to a second embodiment.

FIG. 7 is a diagram illustrating an example of a system configuration of the unwanted facsimile (FAX) management system according to the second embodiment. As illustrated in FIG. 7, the unwanted facsimile management system includes a plurality of fax terminal devices 600 corresponding to a plurality of a plurality of counterparts D, a plurality of MFP 9, and one or more unwanted FAX management server devices 10 (an example of a management server device). At least each of the MFPs 9 and the unwanted FAX management server device 10 are connected to each other via a predetermined communication network such as a phone line, the Internet, or a private network such as a Local Area Network (LAN). The configuration of each MFP 9 is the same as that according to the first embodiment, which is described with reference to FIG. 1 and FIG. 2.

Hardware Configuration of Unwanted FAX Management Server Device

Figure 8:
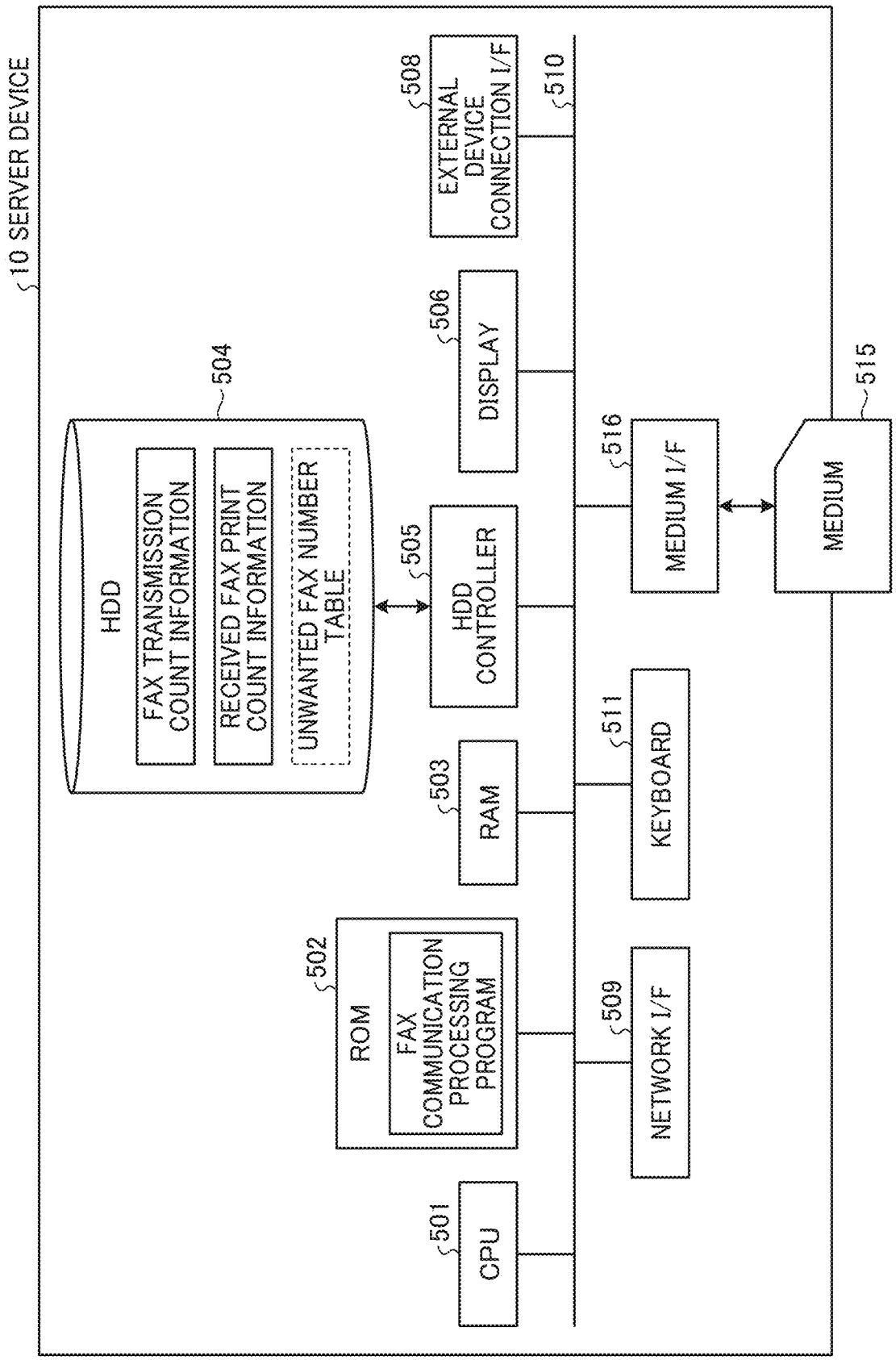
FIG. 8 is a block diagram illustrating an example of a hardware configuration of an unwanted facsimile management server device included in the unwanted facsimile management system according to the second embodiment.

FIG. 8 is a block diagram illustrating an example of a hardware configuration of the unwanted FAX management server device 10 included in the unwanted facsimile management system according to the second embodiment. As illustrated in FIG. 8, the unwanted FAX management server device 10 includes a CPU 501, a ROM 502, and a RAM 503.

The unwanted FAX management server device 10 further includes an HDD 504, an HDD controller 505, a display 506, an external device connection I/F 508, a network I/F 509, a bus line 510, a keyboard 511, and a medium I/F 516.

The CPU 501 performs overall control of the unwanted FAX management server device 10. The ROM 502 stores a program such as an Initial Program Loader (IPL) used for driving the CPU 501. In the ROM 502, a FAX communication processing program for comprehensively determining whether to register a FAX number with respect to which registration for unwanted FAX is instructed by a user, based on the number of FAX transmission times and the number of received FAX printing times transmitted from each MFP 9.

The RAM 503 is used as a work area for the CPU 501. In the HDD 504, various data such as a program is stored. In the HDD 504, FAX transmission count information (information on the number of FAX transmission times) and received FAX print count information (information on the number of received FAX printing times) for each MFP 9 are further stored. An unwanted FAX number table may be stored in a storage unit such as the HDD 909 of each MFP, or may be stored in the HDD 504 of the unwanted FAX management server device 10.

The HDD controller 505 controls writing and reading of various types of information to and from the HDD 504 under control of the CPU 501. The display 506 displays various information such as a cursor, a menu, a window, a character, or an image.

The external device connection I/F 508 is an interface for connecting various external devices including, for example, a Universal Serial Bus (USB) memory and a printer device. The network I/F 509 is an interface that controls data communication performed with an external device through a communication network. Examples of the bus line 510 include an address bus line and a data bus line, which electrically connects the elements, such as the CPU 501, to each other.

The keyboard 511 includes a plurality of keys, and inputs characters, or numerical values, various instructions, for example. The pointing device 512 performs input operations such as selection and execution of various instructions, selection of a processing target, or movement of a cursor.

The medium I/F 516 controls reading and writing (storing) of data from and to a storage medium 515 such as a flash memory.

Functional Configuration of Unwanted FAX Management Server Device

Figure 9:
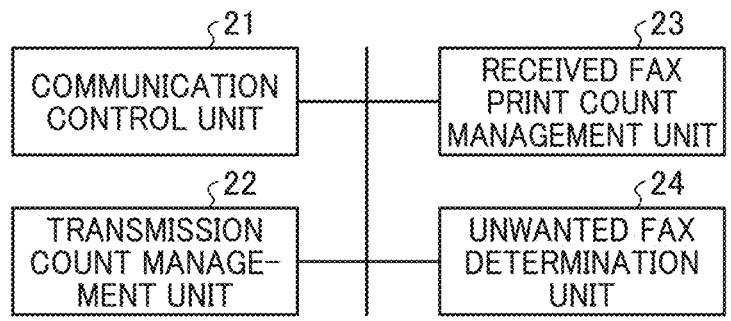
FIG. 9 is a block diagram illustrating an example of a functional configuration of the unwanted FAX management server device according to the second embodiment.

FIG. 9 is a diagram illustrating an example of a functional configuration of the unwanted FAX management server device 10 according to the second embodiment. The CPU 501 executes the FAX communication processing program stored in the ROM 502 and thereby implements functions of a communication control unit 21 (an example of a determination result transmission unit), a transmission count management unit 22, a received FAX print count management unit 23 (an example of an output count management unit), and an unwanted FAX determination unit 24 (an example of a determination unit), which are illustrated in FIG. 9.

The communication control unit 21 performs control of communication with each MFP 9. A transmission count management unit 22 manages a FAX number and the number of transmission times associated with a counterpart to which each of the MFPs 9 transmits a FAX. A received FAX print count management unit 23 manages the FAX number and the number of print times associated with the counterpart with respect to which a FAX among the FAX received by each of the MFPs 9 is printed. When registration for unwanted FAX is performed in any one of the MFPs 9, the unwanted FAX determination unit 24 comprehensively determines whether the registration is reasonable to be performed based on the number of FAX transmission times and the number of printing times in a corresponding one of the MFPs 9.

In the example of the present embodiment, the communication control unit 21 to the unwanted FAX determination unit 24 are implemented by software, using the FAX communication processing program. However, all or a part of these functions may be implemented by hardware such as an IC.

In some embodiments, the FAX communication processing program is stored in a computer-readable recording medium such as a CD-ROM and a FD, as installable or executable file data, for distribution. In some embodiments, the FAX communication processing program is provided by being recorded on a computer-readable recording medium such as a CD-R, a DVD, a BLU-RAY (Registered Trademark) disk, or a semiconductor memory. In some embodiments, the FAX communication processing program is provided by being installed via a network such as the Internet. In some embodiments, the FAX communication processing program is provided by being incorporated in a ROM or the like in the apparatus in advance.

FAX Transmission Notification Transmitting Process

Figure 10:
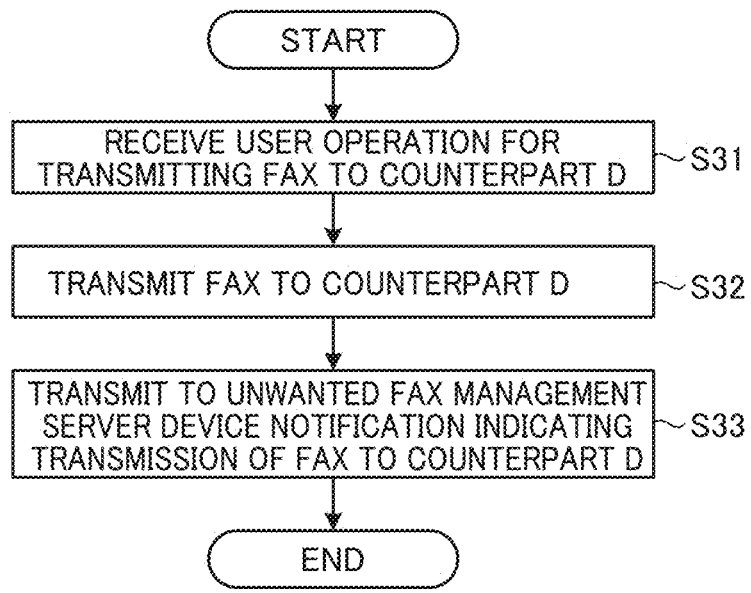
FIG. 10 is a flowchart illustrating an example of a process of notifying the unwanted FAX management server device of that a FAX is transmitted form one of MFPs included in the unwanted facsimile management system according to the second embodiment.

FIG. 10 is a flowchart illustrating an example of a process of notifying the unwanted FAX management server device 10 of that a FAX is transmitted form the MFP 9 included in the unwanted facsimile management system according to the second embodiment. The process may be referred to as a FAX transmission notification transmitting process.

In the flowchart illustrated in FIG. 10, the operation processing unit 11 of the MFP 9 illustrated in FIG. 2 receives a FAX transmission instruction that is an instruction to transmit a FAX to a counterpart D (step S31). The instruction is input by the user via the control panel 940. Then, the FAX transmission control unit 12 causes the FAX device 983 to transmit the FAX to the counterpart D (step S32).

When the FAX transmission is performed as described above, the FAX transmission control unit 12 transmits a FAX transmission notification including the FAX number of the counterpart D and the identification number of the MFP 9 to the unwanted FAX management server device 10 (step S33). The FAX transmission notification is counted and accumulated by the unwanted FAX management server device 10 for each MFP as described later.

Received FAX Print Notification Transmitting Process

Figure 11:
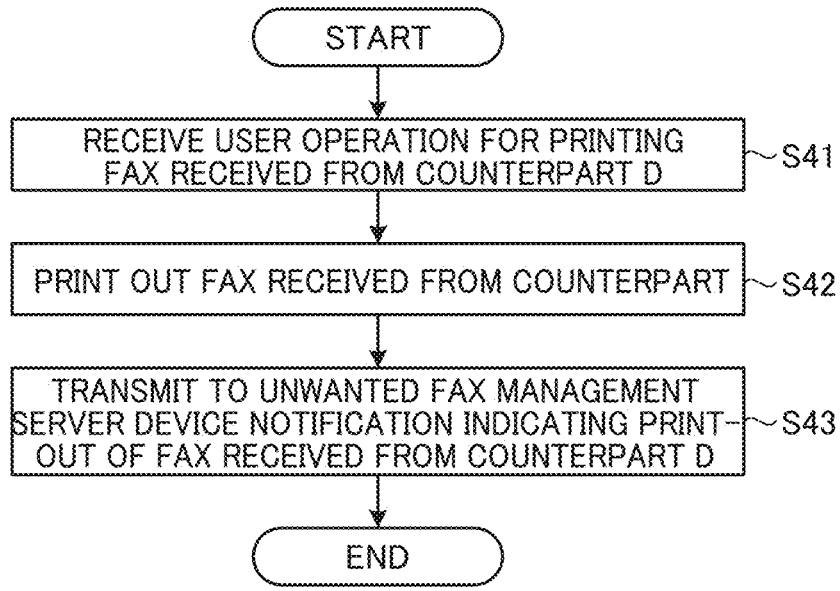
FIG. 11 is a flowchart illustrating an example of a process of notifying the unwanted FAX management server device of that a received FAX is printed by one of the MFPs according to the second embodiment.

FIG. 11 is a flowchart illustrating an example of a process of notifying the unwanted FAX management server device 10 of that a received FAX is printed from the MFP 9 included in the unwanted facsimile management system according to the second embodiment. The process may be referred to as a received FAX print notification transmitting process.

In the flowchart illustrated in FIG. 11, the operation processing unit 11 of the MFP 9 illustrated in FIG. 2 receives a print instruction that is an instruction to print a FAX received from the counterpart D (step S41). The print instruction is input by the user via the control panel 940. In response to the print instruction to print the received FAX, the received FAX print control unit 15 causes the printer 932 to print the received FAX (step S42).

When the received FAX is printed as described above, the FAX transmission control unit 12 transmits a received FAX print notification including the FAX number of the counterpart D and the identification number of the MFP 9 to the unwanted FAX management server device 10 (step S43). The received FAX print notification is counted and accumulated by the unwanted FAX management server device 10 for each MFP as described later.

Count Process Performed by Unwanted FAX Management Server Device

Figure 12:
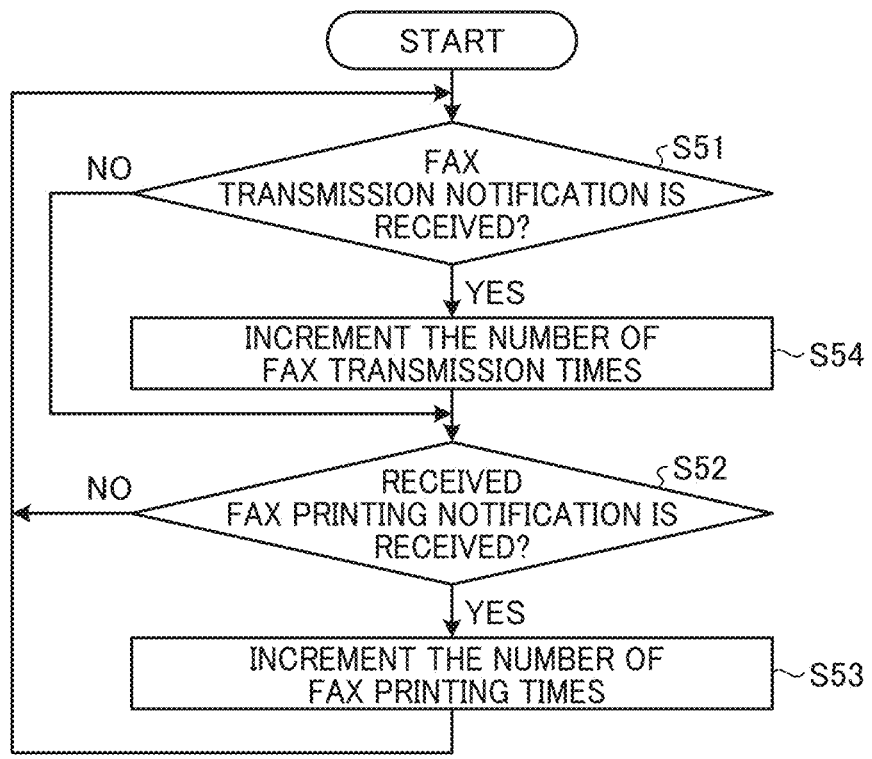
FIG. 12 is a flowchart illustrating an example of a process of updating the number of FAX transmission times and the number of FAX printing times for each MFP in the unwanted FAX management server device according to the second embodiment.

Next, FIG. 12 is a flowchart illustrating a process of updating the number of times of FAX transmission times and the number of FAX printing times for each MFP 9 in the unwanted FAX management server device 10. First, in step S51, the communication control unit 21 of the unwanted FAX management server device 10 illustrated in FIG. 9 determines whether a FAX transmission notification is received from the MFP 9. When the FAX transmission notification is received (step S51: YES), the transmission count management unit 22 determines whether information including the FAX number of the counterpart that is indicated by the FAX transmission notification and the number of transmission times associated with the counterpart, which is indicated by the FAX transmission notification, is stored in the HDD 504. When the FAX number of the counterpart, which is indicated by the FAX transmission notification, and the number of transmission times associated with the FAX number of the counterpart are not stored in the HDD 504, the transmission count management unit 22 newly generates a record of FAX transmission count information to be stored in the HDD 504 (step S54). In the record of FAX transmission count information stored in the HDD 504, the FAX number of the counterpart, which is indicated by the FAX transmission notification, and the number of transmission times (FAX transmission times) corresponding to the FAX number are associated with each other.

When the FAX number of the counterpart, which is indicated by the FAX transmission notification, and the number of transmission times associated with the FAX number of the counterpart, which is indicated by the FAX transmission notification, are already stored in the HDD 504, the transmission count management unit 22 increments the number of FAX transmission times corresponding to the FAX number, which is indicated by the FAX transmission notification, by one to update the FAX transmission count information (step S54).

As described above, the transmission count management unit 22 updates the number of transmission times associated with the FAX number to which a FAX is transmitted, each time the FAX transmission notification is received. Accordingly, the FAX number and the number of FAX transmission times are stored in association with each other in the HDD 504 in a manner that the number of FAX transmission times is counted and accumulated for each MFP from which a FAX is transmitted.

Next, in step S52, the communication control unit 21 of the unwanted FAX management server device 10 illustrated in FIG. 9 determines whether a received FAX print notification is received from the MFP 9. When the received FAX print notification is received (step S521: YES), the received FAX print count management unit 23 determines whether information including the FAX number of the counterpart that is indicated by the received FAX print notification and the number of printing times associated with the counterpart, which is indicated by the received FAX print notification, is stored in the HDD 504. When the FAX number of the counterpart, which is indicated by the received FAX print notification, and the number of printing times associated with the FAX number of the counterpart are not stored in the HDD 504, the received FAX print count management unit 23 newly generates a record of received FAX print count information to be stored in the HDD 504 (step S53). In the record of received FAX print count information stored in the HDD 504, the FAX number of the counterpart, which is indicated by the received FAX print notification, and the number of printing times (received FAX printing times) corresponding to the FAX number are associated with each other.

When the received FAX print count information in which the FAX number indicated by the received FAX print notification and the number of printing times are associated with each other is already stored in the HDD 504, the received FAX print count management unit 23 increments the number of FAX printing times corresponding to the FAX number by one to update the received FAX print count information (step S53).

As described above, the received FAX print count management unit 23 updates the received FAX print count information by storing (registering) or updating the record corresponding to the FAX number with respect to which received content is printed for each time when a received FAX notification is received. Accordingly, the FAX number of the counterpart with respect to which a received FAX is printed by the MFP 9 and the number of printing times are stored in association with each other in the HDD 504.

The unwanted FAX management server device 10 repeatedly performs such a process of updating the FAX transmission count information in the HDD 504 based on the FAX transmission notification. In addition, the unwanted FAX management server device 10 repeatedly performs such a process of updating the received FAX print count information in the HDD 504 based on the received FAX print notification.

Unwanted FAX Determination Process by Unwanted FAX Management Server Device

Figure 13:
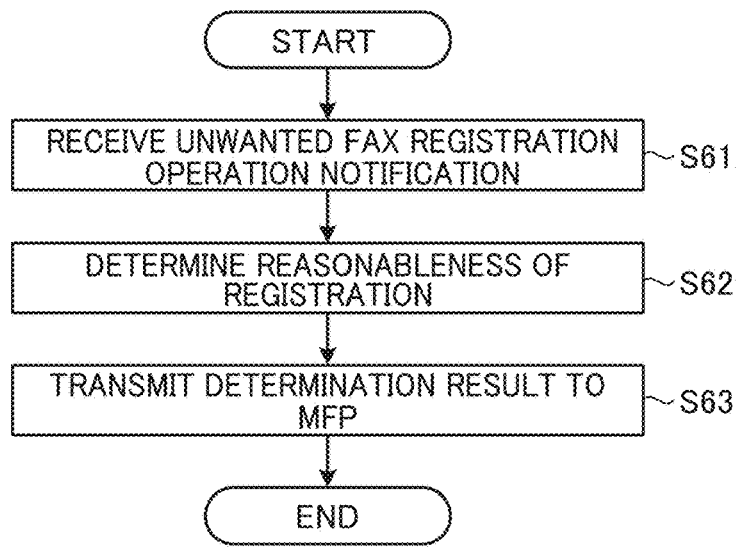
FIG. 13 is a flowchart illustrating an example of a process, performed by the unwanted FAX management server device, of determining whether registration of a FAX number for which incoming faxes are to be rejected is reasonable to be performed, according to the second embodiment.

Next, when registration for unwanted FAX is performed in any one of the MFPs 9, the unwanted FAX management server device 10 determines whether the registration is reasonable to be performed. FIG. 13 is a flowchart illustrating an example of an unwanted FAX determination process performed by the unwanted FAX management server device 10 according to the second embodiment.

When the OK button 100 of the confirmation dialog box illustrated in FIG. 6A is operated by the user for an unwanted FAX registration instruction, unwanted FAX registration unit 14 of the MFP 9 transmits an unwanted FAX registration operation notification including a FAX number specified for the registration for the unwanted FAX to unwanted FAX management server device 10. In step S61 of the flowchart illustrated in FIG. 13, communication control unit 21 illustrated in FIG. 9 receives the unwanted FAX registration operation notification transmitted from the MFP 9.

In step S62, the unwanted FAX determination unit 24 refers to the FAX transmission count information stored in the HDD 504 as described with reference to Table 1. The unwanted FAX management server device 10 according to the second embodiment sets the number of FAX transmission times to "2" when, for example, an MFP-A performs FAX transmission with respect to a FAX number and an MFP-B performs FAX transmission with respect to the same FAX number as the FAX number with respect to which the MFP-A performs the FAX transmission.

That is, the unwanted FAX management server device 10 according to the second embodiment counts and accumulates the number of transmission times for the same FAX number to which a FAX is transmitted by each MFP 9. Accordingly, in the case of the second embodiment, the FAX transmission count information is information indicating the number of transmission times from all MFPs 9 connected to the unwanted FAX management server device 10 to the same FAX number.

The unwanted FAX determination unit 24 multiplies the number of FAX transmission times n1 indicated by the FAX transmission count information corresponding to the FAX number specified to be registered for the unwanted FAX by a predetermined weighting coefficient w1 to calculate a score w1×n1 corresponding to the number of FAX transmission times.

Further, the unwanted FAX determination unit 24 refers to the received FAX printing count information stored in the HDD 504. The unwanted FAX management server device 10 according to the second embodiment sets the number of received FAX printing times to "2" when the MFP-A prints content of a FAX received from a FAX number, and the MFP-C prints content of a FAX received from the same FAX number as the FAX number with respect to which the MFP-A prints the content of the FAX received, for example.

That is, the unwanted FAX management server device 10 according to the second embodiment counts and accumulates the number of received FAX printing times for the same FAX number from which a FAX is received and content of the received FAX is printed by each MFP 9. Accordingly, in the case of the second embodiment, the received FAX printing count information is information indicating the number of printing times for all of the MFPs 9, which are connected to the unwanted FAX management server device 10, performing printing with respect to the same FAX number.

The unwanted FAX determination unit 24 calculates a score n2×W2 corresponding to the number of received FAX printing times by multiplying a predetermined weighting coefficient W2 by the number of received FAX printing times n2 indicated by the received FAX print count information corresponding to the FAX number specified to be registered for the unwanted FAX.

In addition, unwanted FAX determination unit 24 performs addition processing to add the calculated score w1×n1 corresponding to the number of FAX transmission times to the calculated score w2×n2 corresponding to the number of received FAX printing times, and then obtains scores, as described with reference to Table 2 above, Na, Nb, . . . each of which is for the address specified to be registered for the unwanted FAX.

As described above, as the number of FAX transmission times and the number of received FAX printing times increase, each of the scores, Na, Nb, . . . , increases. The unwanted FAX determination unit 24 determines whether a score obtained by adding the score of w1×n1 corresponding to the number of FAX transmission times to the score of w2×n2 corresponding to the number of received FAX printing times is less than a predetermined threshold value. The predetermined threshold value may be set by a user or a designer.

In a case that the score obtained by the addition processing is less than the predetermined threshold value, this means that the FAX number has a small number for both of the number of transmission times and the number of printing times. Such a FAX number is acceptable to be registered for the unwanted FAX. That is, it is thought that there is little problem to register such a FAX number. Accordingly, when the score obtained by the addition processing is less than the predetermined threshold value, the unwanted FAX determination unit 24 determines that the FAX number may be a FAX number to be registered for the "unwanted" FAX.

On the other hand, in a case that the score obtained by the addition processing is equal to or greater than the predetermined threshold value, this means that the FAX number has a large number for both of the number of transmission times and the number of printing times. Such a FAX number has a high probability to be an incorrect FAX number for the registration for the unwanted FAX, which may be an erroneous instruction made by the user.

Accordingly, when the score obtained by the addition processing is equal to or greater than the predetermined threshold value, the unwanted FAX determination unit 24 determines that the FAX number is not a FAX number to be registered for the "unwanted" FAX.

The communication control unit 21 of the unwanted FAX management server device 10 transmits such a determination result to the MFP 9 that has received the unwanted FAX registration operation and transmits to the unwanted FAX management server device 10 the unwanted FAX registration operation notification (step S63), and the process illustrated in FIG. 13 ends.

Unwanted FAX Registration Process by MFP

Figure 14:
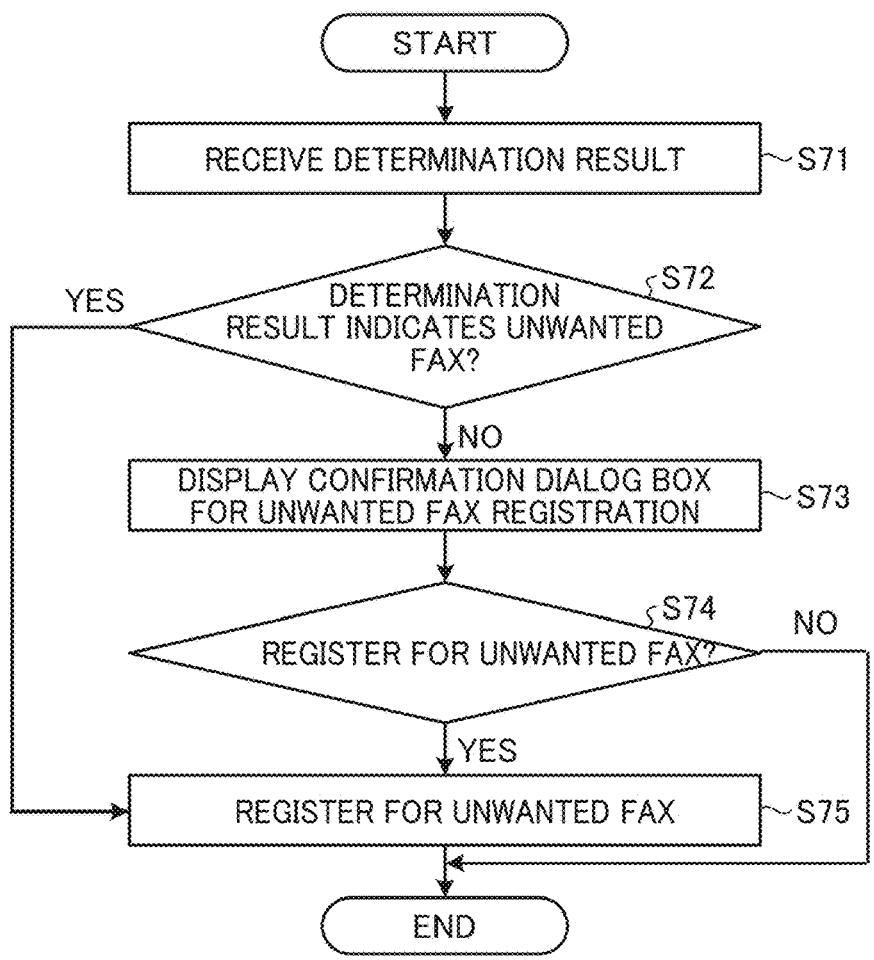
FIG. 14 is a flowchart illustrating an example of a process of performing the registration for the unwanted FAX to reject incoming faxes in the unwanted management system according to the second embodiment.

Next, the MFP 9 that has transmitted the unwanted FAX registration operation notification registers for the unwanted FAX based on a determination result received from the unwanted FAX management server device 10. FIG. 14 is a flowchart illustrating a process of registering for the unwanted FAX (unwanted FAX registration process) performed by the MFP 9 according to the second embodiment. In the flowchart illustrated in FIG. 14, the MFP 9, which has transmitted the unwanted FAX registration operation notification, receives, from the unwanted FAX management server device 10, the determination result indicating whether to register for the unwanted FAX (step S71). The display control unit 17 illustrated in FIG. 2 determines whether the received determination result indicates the registration for the unwanted FAX is reasonable to be performed (step S72). When the received determination result indicates that the registration for the unwanted FAX is reasonable to be performed (step S72: YES), the process of the flowchart of FIG. 14 proceeds to S75.

On the other hand, when the received determination result indicates that the registration for the unwanted FAX may not be reasonable (unreasonable) to be performed (step S72: NO), the display control unit 17 causes the display 940a to display a confirmation dialog box displaying a message or the like for confirming the registration for the unwanted FAX described with reference to FIG. 6B (step S73).

Then, the unwanted FAX registration unit 14 determines whether the execution button 103 on the confirmation dialog box has been operated even though the message for confirming the registration for the unwanted FAX is displayed (step S74).

In a case that the execute button 103 has been operated by the user even when such a message to confirm for the registration is displayed (step74: YES), this means that the user is sure to execute the registration for the unwanted FAX. Accordingly, unwanted FAX registration unit 14 stores the FAX number currently specified by the user in the unwanted FAX number table in the HDD 909 or the HDD 504 (step S75), and the process illustrated in FIG. 14 ends.

On the other hand, when the cancel button 102 on the confirmation dialog box is operated (step S74: NO), this means that the registration of the FAX number for the unwanted FAX is an erroneous operation made by the user. Accordingly, the confirmation dialog box displayed on the display 940a is hided or closed, and the process illustrated in FIG. 14 ends without the unwanted FAX registration unit 14 registering the FAX number specified by the user.

As described above, in relation to the MFP 9 according to the second embodiment, the unwanted FAX management server device 10 counts and accumulates the number of transmission times corresponding to the FAX number transmitted by each MFP 9, and counts and accumulates the number of printing times corresponding to the FAX number from which a FAX is received and with respect to which the received FAX is printed by each MFP 9. In addition, a score corresponding to a counterpart that is not to be for a registration target is calculated by weighting each of the number of FAX transmission times corresponding to the counterpart and the number of received FAX printing times corresponding to the counterpart. Then, whether registration is reasonable to be performed is predicted based on the score in advance, and when a FAX number that is not intended to be registered by a user is specified to be registered for the unwanted FAX, a warning is displayed on a screen to notify the user of an operation (input operation) mistakenly performed by the user.

Accordingly, whether the FAX number specified by the user is reasonable to be registered for the unwanted FAX is comprehensively determined based on the number of transmission times and the number of printing times for each MFP 9. As a result, a probability to mistakenly register information, which is incorrect information on a counterpart, for the unwanted FAX may be greatly reduced or prevented, and the FAX communication reflecting intention of the user is performed. In addition, an inconvenient situation in which the user of the MFP 9 does not receive a FAX from a counterpart from which the user desires to receive a FAX, but receives a FAX from another counterpart from which the user desires to block a FAX may be prevented.

The embodiments described above are presented as examples and are not intended to limit the scope of the present disclosure.

For example, in the second embodiment described above, the number of transmission times and the number of printing times for each of all MFPs 9 connected to the unwanted FAX management server device 10 is counted and accumulated, but all MFP 9 may be divided into several groups, and the number of transmission times and the number of printing times may be counted and accumulated for each group. Accordingly, the registration for the unwanted FAX is managed for each group.

In addition, in the description given above, each of the unwanted FAX determination unit 18 and the unwanted FAX determination unit 24 in a corresponding one of the above-described embodiments, determines whether registration for the unwanted FAX is reasonable to be performed using both the number of FAX transmission times and the number of received FAX printing times.

However, each of the unwanted FAX determination unit 18 and the unwanted FAX determination unit 24 may determine whether registration for the unwanted FAX is reasonable to be performed using either the number of FAX transmission times or the number of received FAX printing times. In that case, when the number of FAX transmission times is used, the number of FAX transmission times is counted and accumulated, but not the number of received FAX printing times. Alternatively, when the number of received FAX printing times is used, the number of received FAX printing times is counted and accumulated, but not the number of FAX transmission times. In case that one of the number of FAX transmission times and the number of FAX printing times is used, the registration of for the unwanted FAX is allowed as described above when the corresponding one of the number of FAX transmissions and the number of received FAX printings is less than a predetermined threshold value.

In addition, in case that one of the number of FAX transmission times and the number of FAX printing times is used, the unwanted FAX determination unit 18 or the unwanted FAX determination unit 24 may determine whether registration for unwanted FAX is reasonable to performed based on a value obtained by multiplying a predetermined weighting coefficient by a corresponding one of the number of FAX transmission times and the number of received FAX printing times. The predetermined weighting coefficient may be set by a user or a designer. In case that one of the number of FAX transmission times and the number of FAX printing times is used, the registration for the unwanted FAX is allowed as described above when the value obtained by multiplying the predetermined weighting coefficient by the corresponding one of the number of FAX transmissions and the number of received FAX printings is less than a predetermined threshold value.

Alternatively, whether registration for the unwanted FAX may be determined by selectively using one of the number of times of FAX transmission times and the number of received FAX printing times by setting a weighting coefficient to be used for multiplication performed on one that is not to be used of the number of times of FAX transmission times and the number of received FAX printing times to "0".

In case that one of the number of FAX transmission times and the number of FAX printing times is used, the unwanted FAX determination unit 18 or the unwanted FAX determination unit 24 determines that the FAX number may be the one to be registered for the unwanted FAX when the corresponding one of the number of FAX transmission times and the number of FAX printing times is less than a predetermined threshold value, due to the reasons described above.

On the other hand, in case that one of the number of FAX transmission times and the number of FAX printing times is used, the unwanted FAX determination unit 18 or the unwanted FAX determination unit 24 determines that the FAX number is not the one to be registered for the unwanted FAX when the corresponding one of the number of FAX transmission times and the number of FAX printing times is equal to or greater than the predetermined threshold value, due to the reasons described above.

As described above, even when one of the number of FAX transmission times and the number of FAX printing times is used, a probability to mistakenly register information, which is incorrect information on a counterpart, for the unwanted FAX may be greatly reduced or prevented.

In addition, the value obtained by multiplying the number of FAX transmission times by a weighting coefficient and the value obtained by multiplying the number of received FAX printing times by a weighting coefficient may be added and used. Alternatively, without multiplying the number of FAX transmission times or the number of received FAX printing times by each corresponding weighting coefficient, a value obtained by adding the number of FAX transmission times to the number of received FAX printing times may be used to determine whether registration for the unwanted FAX is reasonable to be performed. In this case, when the value obtained by adding the number of times of FAX transmission times to the number of received FAX printing times is less than a predetermined threshold value, the FAX number may be a FAX number to be registered for the unwanted FAX for the above-described reason. On the other hand, when the value is equal to or greater than the predetermined threshold value, the FAX number is determined not to be one to be registered for the unwanted FAX for the above-described reason. As a result, a probability to mistakenly register information, which is incorrect information on a counterpart, for the unwanted FAX may be greatly reduced or prevented.

Thus, numerous additional modifications and variations are possible in light of the above teachings. For example, elements and/or features of different illustrative embodiments may be combined with each other and/or substituted for each other within the scope of the present disclosure. These embodiments and modifications thereof are included in the scope and gist of the present disclosure, and are included in the scope of claims and the equivalent scope thereof.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In an incoming fax rejection setting in conventional FAX apparatuses, a user manually inputs a FAX number of a counterpart of which incoming faxes are to be rejected. In such a conventional FAX apparatus, the user may mistakenly input a FAX number of a different counterpart as the FAX number to reject incoming faxes, namely input an incorrect FAX number, which is different from the FAX number of the counterpart of which the incoming faxes are to be rejected. When the incorrect FAX number, which is different from the FAX number of the counterpart of which the incoming faxes are to be rejected, is mistakenly input, a FAX from the different counterpart of which faxes are desired to be received is not received, but a FAX sent from the counterpart of which the incoming faxes are desired to be rejected is received as before. This causes an inconvenience situation for the user.

A facsimile transmission/reception apparatus, an image forming apparatus, an unwanted facsimile (FAX) management program, and an unwanted facsimile (FAX) management system according to embodiments of the present disclosure prevents mistakenly registering for incoming fax rejection and perform communication reflecting intention of a user.

According to embodiments of the present disclosure, registering incorrect information to reject incoming faxes is prevented, and communication reflecting intention of a user is performed.

The invention claimed is:

1. A facsimile communication device, comprising:
circuitry configured to:
count, for each of one or more facsimile numbers, at least one of a number of facsimile transmission times or a number of output times that is stored in association with a corresponding one of the one or more facsimile numbers, the number of facsimile transmission times being counted in relation to a facsimile transmitted, the number of output times being counted in relation to a facsimile received and output;
determine whether registration of a specified facsimile number for unwanted facsimile is reasonable to be performed, based on at least one of first information or second information, the first information indicating the number of facsimile transmission times associated with the specified facsimile number, the second information indicating the number of output times associated with the specified facsimile number, the specified facsimile number being included in the one or more facsimile numbers; and
in response to a determination result indicating that the registration of the specified facsimile number for the unwanted facsimile is reasonable to be performed, register the specified facsimile number for the unwanted facsimile.

2. The facsimile communication device of claim 1, wherein,
in a case that the number of facsimile transmission times indicated with the first information is less than a threshold value, the circuitry determines that the registration of the specified facsimile number for the unwanted facsimile is reasonable to be performed.

3. The facsimile communication device of claim 1, wherein,
in a case that the number of output times indicated with the second information is less than a threshold value, the circuitry determines that the registration of the specified facsimile number for the unwanted facsimile is reasonable to be performed.

4. The facsimile communication device of claim 1, wherein,
in a case that a value obtained by multiplying a weighting coefficient by the number of facsimile transmission times indicated with the first information is less than a threshold value, the circuitry determines that the registration of the specified facsimile number for the unwanted facsimile is reasonable to be performed.

5. The facsimile communication device of claim 1, wherein,
in a case that a value obtained by multiplying a weighting coefficient by the number of output times indicated with the second information is less than a threshold value, the circuitry determines that the registration of the specified facsimile number for the unwanted facsimile is reasonable to be performed.

6. The facsimile communication device of claim 1, wherein,
in case that a value obtained by adding a first value and a second value is less than a threshold value, the circuitry determines that the registration of the specified facsimile number for the unwanted facsimile is reasonable to be performed, the first value being obtained by multiplying a first weighting coefficient by the number of facsimile transmission times indicated with the first information, the second value being obtained by multiplying a second weighting coefficient by the number of output times indicated with the second information.

7. The facsimile communication device of claim 1, wherein, in response to determining that the registration of the specified facsimile number for the unwanted facsimile is unreasonable to be performed, the circuitry causes a display to display a confirmation screen for the registration of the specified facsimile number for the unwanted facsimile, and
wherein, in response to receiving, via the confirmation screen, a user input of an execution instruction to perform the registration of the specified facsimile number for the unwanted facsimile, the circuitry registers the specified facsimile number for the unwanted facsimile.

8. The facsimile communication device of claim 1, wherein
the number of output times includes a number of times to print out content of a facsimile received.

9. An image forming apparatus, comprising
the facsimile communication device of claim 1.

10. A registration method, comprising:
counting, for each of one or more facsimile numbers, at least one of a number of facsimile transmission times or a number of output times that is stored in association with a corresponding one of the one or more facsimile numbers, the number of facsimile transmission times being counted in relation to a facsimile transmitted, the number of output times being counted in relation to a facsimile received and output;
determining whether registration of a specified facsimile number for unwanted facsimile is reasonable to be performed, based on at least one of first information or second information, the first information indicating the number of facsimile transmission times associated with the specified facsimile number, the second information indicating the number of output times associated with the specified facsimile number, the specified facsimile number being included in the one or more facsimile numbers; and
registering the specified facsimile number for the unwanted facsimile, in response to a determination result indicating that the registration of the specified facsimile number for the unwanted facsimile is reasonable to be performed.

11. A non-transitory recording medium storing a plurality of instructions which, when executed by one or more processors, causes the processors to perform a method, the method comprising:

counting, for each of one or more facsimile numbers, at least one of a number of facsimile transmission times or a number of output times that is stored in association with a corresponding one of the one or more facsimile numbers, the number of facsimile transmission times being counted in relation to a facsimile transmitted, the number of output times being counted in relation to a facsimile received and output;

determining whether registration of a specified facsimile number for unwanted facsimile is reasonable to be performed, based on at least one of first information or second information, the first information indicating the number of facsimile transmission times associated with the specified facsimile number, the second information indicating the number of output times associated with the specified facsimile number, the specified facsimile number being included in the one or more facsimile numbers; and registering the specified facsimile number for the unwanted facsimile, in response to a determination result indicating that the registration of the specified facsimile number for the unwanted facsimile is reasonable to be performed.

\* \* \* \* \*